(12) United States Patent
Hand et al.

(10) Patent No.: US 8,913,730 B2
(45) Date of Patent: Dec. 16, 2014

(54) COMMUNICATION SYSTEM WITH MESSAGE PRIORITIZATION MECHANISM AND METHOD OF OPERATION THEREOF

(71) Applicant: Samsung Electronics Co., Ltd., Gyeonggi-Do (KR)

(72) Inventors: Anthony D. Hand, San Jose, CA (US); Nastasha Tan, San Francisco, CA (US); Yun Z. Wu, San Francisco, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/833,197

(22) Filed: Mar. 15, 2013

(65) Prior Publication Data
US 2014/0270131 A1 Sep. 18, 2014

(51) Int. Cl.
*H04M 3/42* (2006.01)
*H04L 29/08* (2006.01)
(52) U.S. Cl.
CPC *H04L 67/10* (2013.01); *H04M 3/42* (2013.01)
USPC .................................. 379/208.01; 379/201.01

(58) Field of Classification Search
USPC ........................................ 379/208.01, 201.01
See application file for complete search history.

(56) References Cited

U.S. PATENT DOCUMENTS

| 8,095,613 | B1 | 1/2012 | Perkowitz et al. |
| 2003/0078983 | A1 | 4/2003 | Sullivan |
| 2007/0022157 | A1 | 1/2007 | Daniels et al. |
| 2008/0139167 | A1* | 6/2008 | Burgess ............ 455/404.1 |
| 2012/0221961 | A1 | 8/2012 | Reynolds |

FOREIGN PATENT DOCUMENTS

EP 1998518 5/2007

* cited by examiner

*Primary Examiner* — Quynh Nguyen
(74) *Attorney, Agent, or Firm* — IP Investment Law Group (57) ABSTRACT

A method of operation of a communication system includes: processing a communication event by a control module; identifying a contact list entry from the communication event; calculating an urgency based priority for the communication event; generating a pending communication list, having the urgency based priority for displaying on a display device; and generating a communication event indicator, for the contact list entry, having the largest instance of the urgency based priority from the pending communication list for displaying on the device.

20 Claims, 6 Drawing Sheets

FIG. 6

COMMUNICATION SYSTEM WITH MESSAGE PRIORITIZATION MECHANISM AND METHOD OF OPERATION THEREOF

TECHNICAL FIELD

An embodiment of the present invention relates generally to a communication system, and more particularly to a system for managing communication.

BACKGROUND

Wireless communications provide nearly ubiquitous communication connectivity in the world. A portion of the population of every nation possesses a mobile communication device. The technological sophistication of users of mobile communication devices ranges from those who merely want to use their mobile communication device to access plain old telephone service (POTS) to those who have high speed data service plans and use their mobile communication device to access the Internet.

The convergence of technologies has created a communication dilemma since the smart-phone is capable of receiving telephone calls, e-mails, text messages, and instant messages. The user of a smart-phone can be overwhelmed by a communication avalanche. The ability to receive any type of written or verbal communication makes the smart-phone a powerful communication tool, but it can also make managing important communication very difficult.

Thus, a need still remains for a communication system with message prioritization mechanism to maintain control of high-priority communication. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a communication system including: processing a communication event by a control module; identifying a contact list entry from the communication event; calculating an urgency based priority for the communication event; generating a pending communication list, having the urgency based priority for displaying on a display device; and generating a communication event indicator, for the contact list entry, having the largest instance of the urgency based priority from the pending communication list for displaying on the device.

An embodiment of the present invention provides a method of operation of a communication system including: processing a communication event by a control module including receiving a telephone call; identifying a contact list entry from the communication event by monitoring an identification of the telephone call; calculating an urgency based priority for the communication event including retrieving a history of previous instances of the communication event from the contact list entry; generating a pending communication list, having the urgency based priority for displaying on a device; and generating a communication event indicator, for the contact list entry, having the largest instance of the urgency based priority from the pending communication list for displaying on the device.

An embodiment of the present invention provides a communication system, including: a contact list entry module configured to identify a contact list entry from a communication event; a message priority module, coupled to the contact list entry module, configured to calculate an urgency based priority of the communication event; a save pending communication list module, coupled to the control module, configured to generate a pending communication list having the urgency based priority for displaying on a display device; and an update priority module, coupled to the control module, configured to select a communication event indicator, for the contact list entry, having the largest instance of the urgency based priority from the pending communication list with the communication event indicator for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The embodiment of the communication system provides a flexible management system for displaying the urgency based priority which can be scaled by the urgency of the communication event. If the conditional trigger check module is activated, the communication event can be altered in urgency to provide the urgency based priority in order to solicit a more rapid response to the communication event. The conditional trigger check module is independent of the communication event and can escalate the urgency without the knowledge or action of the contact list entry that is a part of the enhanced priority group.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which image information is expressed is not critical to some embodiments of the invention. For example, in some embodiments, image information is presented in the format of (X,Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "contact list" referred to herein can include a construct for compiling contact information for any person or entity that has been in communication with the user of a device, wherein the construct can be maintained locally or distributed through multiple devices linked through a communication network.

Figure 1:
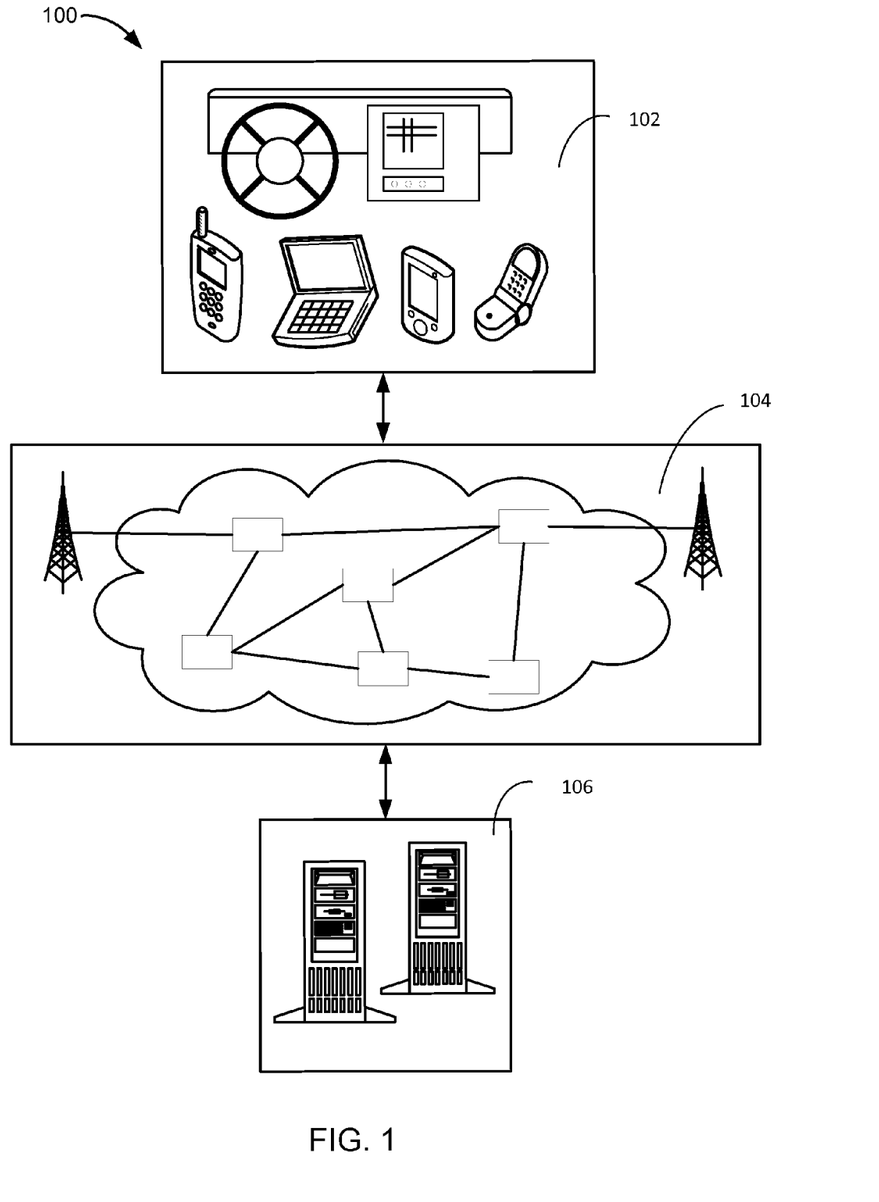
FIG. 1 is a communication system with message prioritization mechanism in an embodiment of the present invention.

Referring now to FIG. 1, therein is shown a communication system 100 with message prioritization mechanism in an embodiment of the present invention. The communication system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

For illustrative purposes, the communication system 100 is described with the first device 102 as a communication device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a computer with a monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the communication system 100 is described with the second device 106 as a computing device, although it is understood that the second device 106 can be different types of devices. Also for illustrative purposes, the communication system 100 is shown with the second device 106 and the first device 102 as end points of the communication path 104, although it is understood that the communication system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (lrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
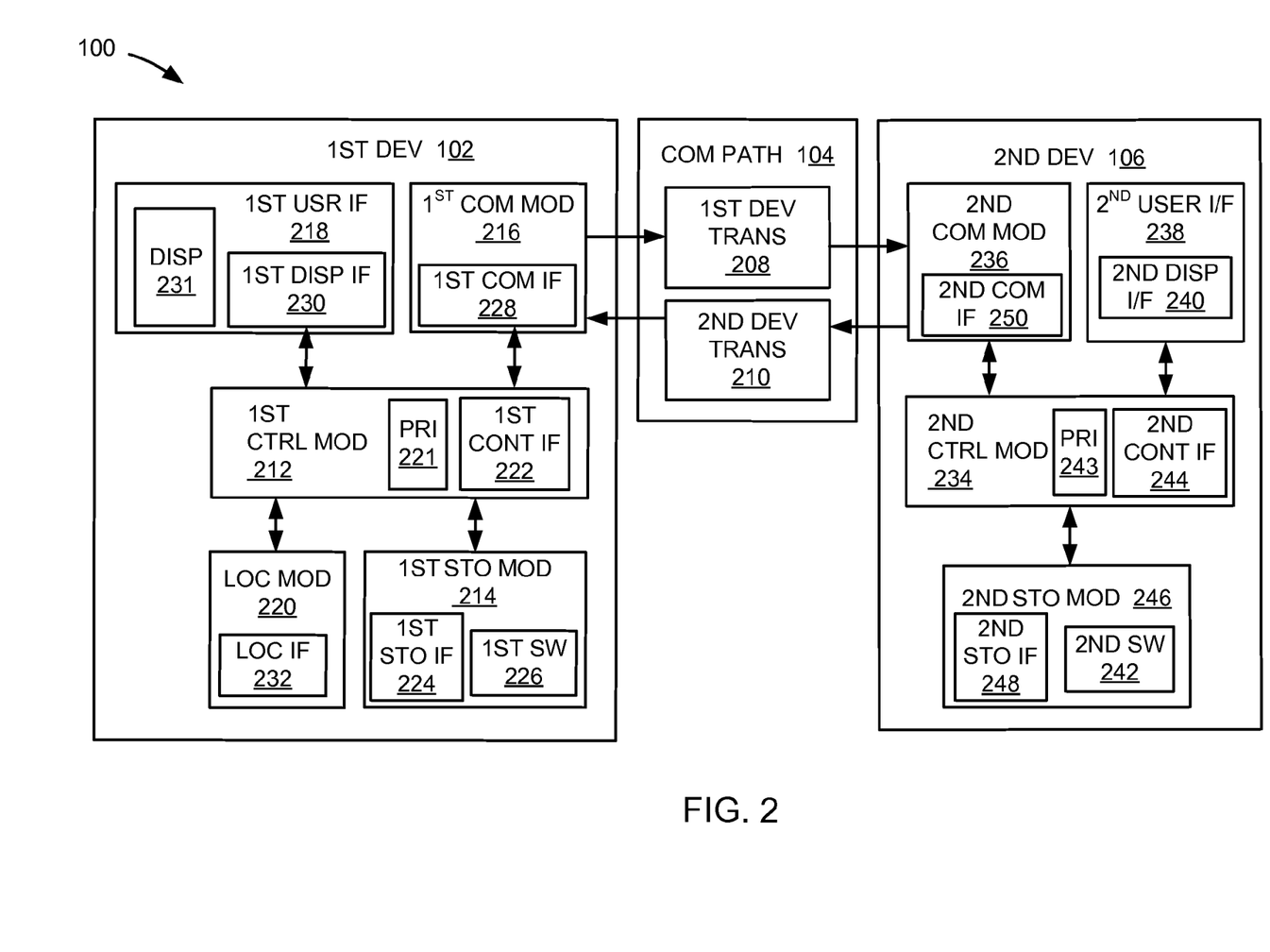
FIG. 2 is an exemplary block diagram of the communication system with call management mechanism in an embodiment of the present invention.

Referring now to FIG. 2, therein is shown an exemplary block diagram of the communication system 100 with message prioritization mechanism in an embodiment of the present invention. The communication system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively.

The first device 102 can send information in a first device transmission 208 over the communication path 104 to the second device 106. The second device 106 can send information in a second device transmission 210 over the communication path 104 to the first device 102.

For illustrative purposes, the communication system 100 is shown with the first device 102 as a client device, although it is understood that the communication system 100 can have the first device 102 as a different type of device. For example, the first device 102 can be a server.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control module 212, a first storage module 214, a first communication module 216, a first user interface 218, and a location module 220. The first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train.

The first control module 212 can include a first message priority module 221 and a first control interface 222. The first control module 212 can be implemented in a number of different manners. For example, the first control module 212 can be a processor, an embedded processor, a microprocessor, a hardware control logic, a hardware finite state machine (FSM), a digital signal processor (DSP), or a combination thereof.

The first message priority module 221 can be implemented in different ways and can include hardware gates, software routines, processors, combinational logic, or a combination thereof. The first message priority module 221 can monitor all communication events received through the first communication module 216. The first communication module 216 can receive the communication events which include e-mails, text messages, telephone calls, instant messages, voice over Internet protocol (VOIP) messages, or a combination thereof. The first message priority module 221 can generate a statistical priority for each of the communication events, received by the first communication module 216, for later processing.

The first message priority module 221 can be coupled to the first control interface 222. The first message priority module 221 can access the first storage module 214 through the first control interface 222 for storing the statistics related to each of the communication events received from the first communication module 216.

The first control interface 222 can be implemented in different ways and can include different implementations depending on which functional modules or external modules are being interfaced with the first controller interface 222. For example, the first controller interface 222 can be implemented with a pressure sensor, an inertial sensor, a micro electro-mechanical system (MEMS), optical circuitry, waveguides, wireless circuitry, wireline circuitry, or a combination thereof.

The first storage module 214 can include a first storage interface 224. The first storage module 214 can be a volatile memory, a nonvolatile memory, an internal memory, an external memory, or a combination thereof. For example, the first storage module 214 can be a nonvolatile storage such as non-volatile random access memory (NVRAM), Flash memory, disk storage, or a volatile storage such as static random access memory (SRAM).

The first storage interface 224 can be can be used for communication between the location module 220 and other functional modules in the first device 102. The first storage interface 224 can also be used for communication that is external to the first device 102.

The first storage interface 224 can receive information from the other functional modules or from external sources, or can transmit information to the other functional modules or to external destinations. The external sources and the external destinations refer to sources and destinations external to the first device 102.

The first storage interface 224 can include different implementations depending on which functional modules or external modules are being interfaced with the first storage module 214. The first storage interface 224 can be implemented with technologies and techniques similar to the implementation of the first controller interface 222. A first software 226 can be stored in the first storage module 214.

The first communication module 216 can include a first communication interface 228. The first communication module 216 can enable external communication to and from the first device 102. For example, the first communication module 216 can permit the first device 102 to communicate with the second device 106, an attachment, such as a peripheral device or a computer desktop, and the communication path 104.

The first communication module 216 can also function as a communication hub allowing the first device 102 to function as part of the communication path 104 and not limited to be an end point or terminal module to the communication path 104. The first communication module 216 can include active and passive components, such as microelectronics or an antenna, for interaction with the communication path 104.

The first communication interface 228 can be used for communication between the first communication module 216 and other functional modules in the first device 102. The first communication interface 228 can receive information from the other functional modules or can transmit information to the other functional modules.

The first communication interface 228 can include different implementations depending on which functional modules are being interfaced with the first communication module 216. The first communication interface 228 can be implemented with technologies and techniques similar to the implementation of the first controller interface 222.

The first user interface 218 can include a first display interface 230. The first user interface 218 can include an input device and an output device. Examples of the input device of the first user interface 218 can include a keypad, a touchpad, soft-keys, a keyboard, a microphone, or any combination thereof to provide data and communication inputs. Examples of the output device of the first user interface 218 can include the first display interface 230. The first display interface 230 can include a display device 231. Examples of the display device 231 can include a projector, a video screen, a touch screen, or any combination thereof.

The location module 220 can include a location interface 232. The location module 220 can be implemented in many ways. For example, the location module 220 can function as at least a part of a global positioning system (GPS), an inertial navigation system, a cellular-tower location system, a pressure location system, or any combination thereof.

The location interface 232 can be used for communication between the location module 220 and other functional modules in the first device 102. The location interface 232 can also be used for communication that is external to the first device 102.

The location interface 232 can receive information from the other functional modules or from external sources, or can transmit information to the other functional modules or to external destinations. The external sources and the external destinations refer to sources and destinations external to the first device 102.

The location interface 232 can include different implementations depending on which functional modules or external modules are being interfaced with the location module 220. The location interface 232 can be implemented with technologies and techniques similar to the implementation of the first controller interface 222.

The second device 106 can be optimized for implementing the embodiment of the present invention in a multiple device embodiment with the first device 102. The second device 106 can provide the additional or higher performance processing power compared to the first device 202. The second device 106 can include a second control module 234, a second communication module 236, and a second user interface 238.

The second user interface 238 allows a user (not shown) to interface and interact with the second device 206. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control module 234 can execute a second software 242 to provide the intelligence of the second device 106 of the communication system 200. The second software 242 can operate in conjunction with the first software 226. The second control module 234 can provide additional performance compared to the first control module 212.

The second control module 234 can operate the second user interface 238 to display information. The second control module 234 can also execute the second software 242 for the other functions of the communication system 100, including operating the second communication module 236 to communicate with the first device 102 over the communication path 104.

The second control module 234 can be implemented in a number of different manners. For example, the second control module 234 can be a processor, an embedded processor, a microprocessor, a hardware control logic, a hardware finite state machine (FSM), a digital signal processor (DSP), or a combination thereof.

The second control module 234 can include a second message priority module 243 and a second controller interface 244. The second controller interface 244 can be used for communication between the second control module 234 and other functional modules in the second device 106. The second controller interface 244 can also be used for communication that is external to the second device 106.

The second message priority module 243 can be implemented in different ways and can include hardware gates, software routines, processors, combinational logic, or a combination thereof. The second message priority module 243 can assist the first message priority module 221 in calculating the priority of the communication events sent to the first device 102.

The second message priority module 243 can calculate a message priority in support of the first message priority module 221. The second message priority module 243 can combine any of the communication events sent by a single user in order to calculate the overall priority of the communication event.

The second controller interface 244 can receive information from the other functional modules or from external sources, or can transmit information to the other functional modules or to external destinations. The external sources and the external destinations refer to sources and destinations external to the second device 106.

The second controller interface 244 can be implemented in different ways and can include different implementations depending on which functional modules or external modules are being interfaced with the second controller interface 244. For example, the second controller interface 244 can be implemented with a pressure sensor, an inertial sensor, a micro electro-mechanical system (MEMS), optical circuitry, waveguides, wireless circuitry, wireline circuitry, or a combination thereof.

A second storage module 246 can store the second software 242. The second storage module 246 can also store the relevant information, such as contact lists, caller identifications, established groups, recorded messages, response options, priority of the communication events, or any combination thereof. The second storage module 246 can be sized to provide the additional storage capacity to supplement the first storage module 214.

For illustrative purposes, the second storage module 246 is shown as a single element, although it is understood that the second storage module 246 can be a distribution of storage elements. Also for illustrative purposes, the communication system 100 is shown with the second storage module 246 as a single hierarchy storage system, although it is understood that the navigation system 100 can have the second storage module 246 in a different configuration. For example, the second storage module 246 can be formed with different storage technologies forming a memory hierarchal system including different levels of caching, main memory, rotating media, or off-line storage.

The second storage module 246 can be a volatile memory, a nonvolatile memory, an internal memory, an external memory, or a combination thereof. For example, the second storage module 246 can be a nonvolatile storage such as non-volatile random access memory (NVRAM), Flash memory, disk storage, or a volatile storage such as static random access memory (SRAM).

The second storage module 246 can include a second storage interface 248. The second storage interface 248 can be used for communication between the second control module 234 and other functional modules in the second device 106. The second storage interface 248 can also be used for communication that is external to the second device 106.

The second storage interface 248 can receive information from the other functional modules or from external sources, or can transmit information to the other functional modules or to external destinations. The external sources and the external destinations refer to sources and destinations external to the second device 106.

The second storage interface 248 can include different implementations depending on which functional modules or external modules are being interfaced with the second storage module 246. The second storage interface 248 can be implemented with technologies and techniques similar to the implementation of the second controller interface 244.

The second communication module 236 can enable external communication to and from the second device 206. For example, the second communication module 236 can permit the second device 106 to communicate with the first device 102 over the communication path 104.

The second communication module 236 can also function as a communication hub allowing the second device 106 to function as part of the communication path 104 and not limited to be an end point or terminal module to the communication path 104. The second communication module 236 can include active and passive components, such as microelectronics or an antenna, for interaction with the communication path 104. The second communication module 236 can receive the communication events which include e-mails, text messages, telephone calls, instant messages, voice over Internet protocol (VOIP), or a combination thereof on behalf of the first device 102 when the first device 102 is unavailable.

The second communication module 236 can include a second communication interface 250. The second communication interface 250 can be used for communication between the second communication module 236 and other functional modules in the second device 106. The second communication interface 250 can receive information from the other functional modules or can transmit information to the other functional modules.

The second communication interface 250 can include different implementations depending on which functional modules are being interfaced with the second communication module 236. The second communication interface 250 can be implemented with technologies and techniques similar to the implementation of the second controller interface 244.

The first communication module 216 can couple with the communication path 104 to send information to the second device 106 in the first device transmission 208. The second device 106 can receive information in the second communication module 236 from the first device transmission 208 of the communication path 104.

The second communication module 236 can couple with the communication path 104 to send information to the first device 102 in the second device transmission 210. The first device 102 can receive information in the first communication module 216 from the second device transmission 210 of the communication path 104. The communication system 200 can be executed by the first control module 212, the second control module 234, or a combination thereof.

For illustrative purposes, the second device 106 is shown with the partition having the second user interface 238, the second storage module 246, the second control module 234, and the second communication module 236, although it is understood that the second device 106 can have a different partition. For example, the second software 242 can be partitioned differently such that some or all of its function can be in the second control module 234 and the second communication module 236. In addition, the second device 106 can include other functional modules not shown in FIG. 2 for clarity.

The functional modules in the first device 102 can work individually and independently of the other functional modules. The first device 102 can work individually and independently from the second device 106 and the communication path 104.

The functional modules in the second device 106 can work individually and independently of the other functional modules. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100. For example, the first device 102 is described to operate the location module 220, although it is understood that the second device 106 can also operate the location module 220.

Figure 3:
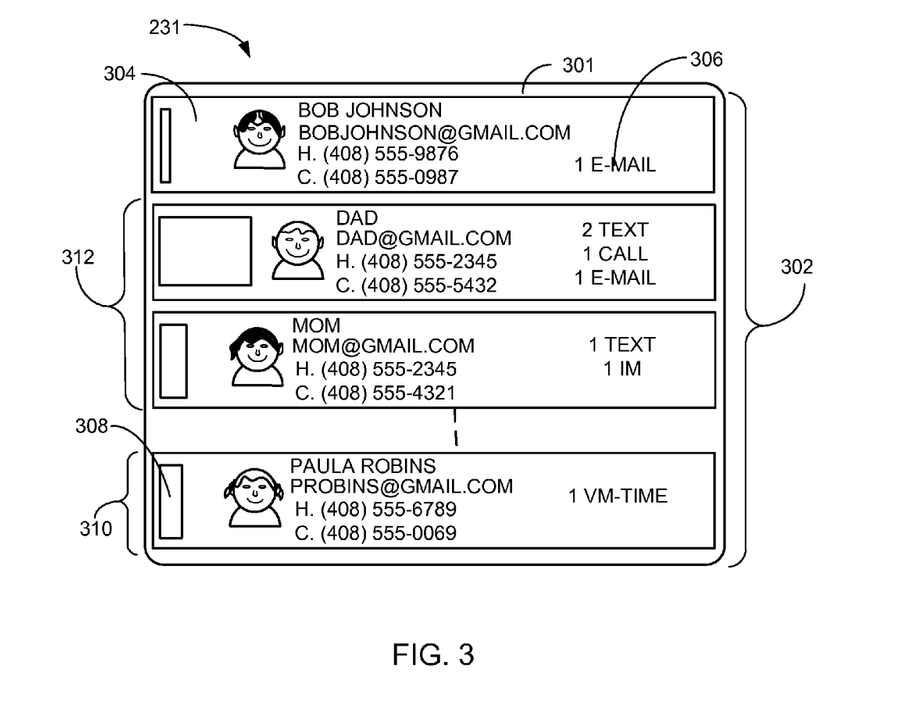
FIG. 3 is an exemplary diagram of the display device having a message prioritization panel.

Referring now to FIG. 3, therein is shown an exemplary diagram of the display device 231 having a message prioritization panel 301. The exemplary diagram of the display device 231 can include the message prioritization panel 301 for displaying a pending communication list 302 including a communication event indicator 304 for each instance of a contact list entry 310 for which a communication event 306 was processed by the first control module 212 of FIG. 2 or the second control module 234 of FIG. 2. If the communication event 306 is from an initiator that is not among the contact list entry 310 a temporary label, such as the caller identification, can be used for the contact list entry 310 and an urgency based priority 308 can be generated from the content of the communication event 306 for display in the communication event indicator 304. The urgency based priority 308 can be calculated based on the statistical analysis, of the current and previous instances of the communication event 306, performed by the first message priority module 221 of FIG. 2.

The communication event 306 can include e-mails, text messages, telephone calls, instant messages, voice over Internet protocol (VOIP) messages, or a combination thereof. The pending communication list 302 can be displayed in the time order in which the communication events 306 were received or in priority list order with the highest priority listed first. The configuration options for the display of the pending communication list 302 can be managed through the first user interface 218 of FIG. 1. It is understood that the communication event 306 can include other communication types that are conveyed to the first device 102. Of FIG. 1.

The urgency based priority 308, such as a rectangular shape or a sequence of audio alerts, can indicate a degree of urgency for each of the communication event indicator 304. The size, color, display type, audio notification, or a combination thereof of the urgency based priority 308 can indicate the relative urgency assigned to each of the communication event indicator 304. Each of the communication events 306 can incrementally add to the urgency of the communication event indicator 304. An increase in the urgency of communication event indicator 304 can be indicated by increasing the physical size of the urgency based priority 308. The larger the urgency based priority 308 is, the higher degree of urgency is indicated for the communication event indicator 304.

An enhanced priority group 312 can include one or more friends, relatives, or business associates that require an altered level of urgency to the communication event 306 that originates from the members of the enhanced priority group 312. The enhanced priority group 312 can link more than one of the contact list entry 310 or alter the urgency based priority 308 of an individual of the contact list entry 310. The storage module 214 of FIG. 2, coupled to the control module 212 of FIG. 2, can be configured to establish the enhanced priority group 312 having the contact list entry 310 stored therein.

By way of example the enhanced priority group 312 can include Mom and Dad, who can be linked to provide the urgency based priority 308. In this example the urgency based priority 308 is displayed as a wide instance of the urgency based priority 308 in the communication event indicator 304 for Dad. It is understood that any group of the contact list entry 310 can be so grouped and a suitable member of the group can be designated to represent the urgency based priority 308 for the group. The urgency based priority 308 for each of the members of the enhanced priority group 312 will be shown in the individual communication event indicator 304 and the urgency based priority 308 of the designated head of the enhanced priority group 312 can reflect the urgency based priority 308 of the other members.

It is understood that any number of the enhanced priority groups 312 can be designated and the enhanced priority group 312 can include one or more members. It is understood that the urgency based priority 308 can vary in size, color, shape or the combination thereof in order to indicate the relative urgency in the communication event indicator 304 as compared to others in the pending communication list 302. It is also understood that the enhanced priority group 312 can individually adjust the calculation of the urgency based priority 308 to increase or diminish the priority value of the communication event 306 for the contact list entry 310 in the enhanced priority group 312.

Movement in the physical world results in changes to the display device 231 allowing an access of the communication event indicator 304 having the most urgent need as indicated by urgency based priority 308. Once the communication event indicator 304 has been addressed and the contact list entry 310 receives a response, the communication event indicator is deleted from the pending communication list 302. Any of the other instances of the communication event indicator 304 will remain in the pending communication list 302 until a response is sent for each of them.

Figure 4:
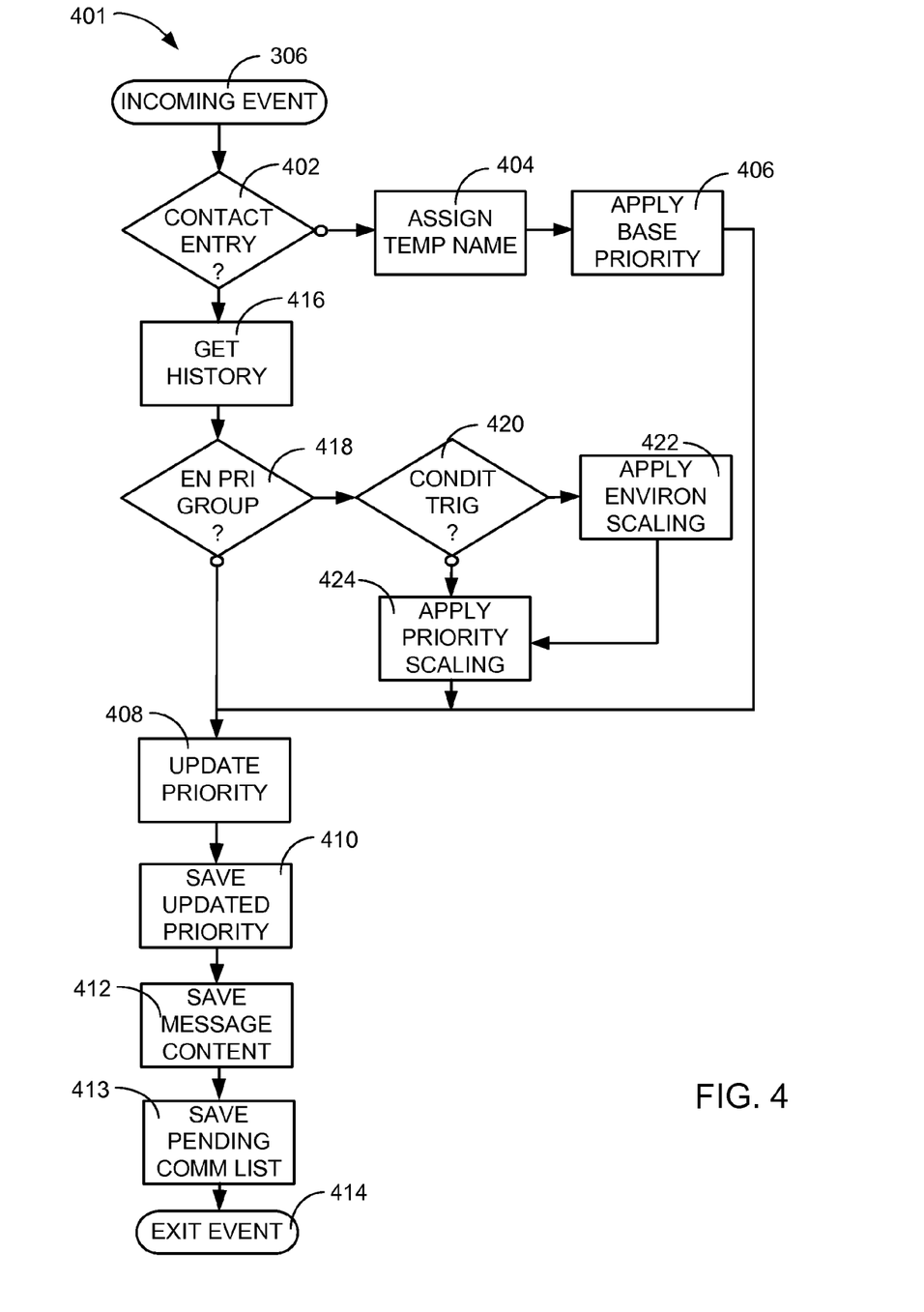
FIG. 4 is a control flow of the communication system for the communication event in a priority determination process of the embodiment of the present invention.

Referring now to FIG. 4, therein is shown a control flow of the communication system 100 for the communication event 306 in a priority determination process 401 of the embodiment of the present invention. The control flow for the communication event 306 in the priority determination process 401 depicts the communication event 306 initiating the priority determination process 401. The control module 212 of FIG. 2 receives the communication event 306 which can include e-mails, text messages, telephone calls, instant messages, voice over Internet protocol (VOIP) messages, or a combination thereof. The control module 212 can generate the pending communication list 302 based on receiving the communication event 306.

The flow can proceed to a contact list entry module 402, which can determine whether the communication event 306 was initiated from the contact list entry 310 of FIG. 3. The contact list entry 310 can include any person, organization, business, or entity which has previously engaged in the communication event 306 with the first device 102 of FIG. 1. If it is determined that the communication event 306 is from a source that does not have the contact list entry 310, the flow proceeds to an assign temp name module 404.

The assign temp name module 404 can extract a temporary name from the communication event 306 in order to establish a reference name. The assign temp name module 404 can utilize the caller identification, header information from a text message, e-mail, instant message, or VOIP message for the contact list entry 310. The assign temp name module 404 can be used to identify the communication event 306 that can be repeated from the same source. The flow then proceeds to a base priority module 406.

The base priority module 406 can establish the initial priority for the communication event 306. It is understood that the base priority module 406 can assign a low priority to the communication event 306 because the source is not recognized by the first device 102. Any subsequent occurrences of the communication event 306 from the same source can be attributed to the contact list entry 310 assigned by the assign temp name module 404 and the associated priority for the subsequent occurrence of the communication event 306 can be adjusted.

The base priority module 406 can analyze the content of the communication event 306 in order to establish an initial value for the urgency based priority 308 of FIG. 3. The urgency based priority 308 will be stored and attributed to the contact list entry 310 assigned by the assign temp name module 404.

The flow then proceeds to an update priority module 408. The update priority module 408 can accept the urgency based priority 308 associated with the contact list entry 310 and update the urgency based priority 308 based on the content of the communication event 306. The update priority module 408 can perform a search of keywords for time sensitivity, sadness, anger, fear, happiness, questions, or a combination thereof. It is understood that the search of keywords for time sensitivity can include scanning text or parsing audio files for the keywords. Each of the keywords can impart an incremental value to the urgency based priority 308 of the communication event 306.

The update priority module 408 can calculate the urgency based priority 308 of the communication event indicator 304 of FIG. 3 based on the content of the communication event 306 and the history data from the communication event indicator 304. The result of the analysis of the update priority module 408 can incrementally increase the size of the urgency based priority 308 of the communication event indicator 304.

The flow then proceeds to a save updated priority module 410. The save updated priority module 410 can store the value of the priority for the reference name in the first storage module 214 of FIG. 2 and save the pending communication list 302 in the first storage module 214 of the first device 102 or it can initiate a transfer of the updated version of the pending communication list 302 of FIG. 3 to the second storage module 246 of FIG. 2 within the second device 106 of FIG. 1. The save updated priority module 410 can maintain a look-up table in the first storage module 214 for accessing a list of priorities and the pending communication list 302. The save updated priority module 410 can establish new entries in the pending communication list 302 or update the priority for entries that already exist in the pending communication list 302. Access to the second device 106 can be a back-up process or it can be configured as the default storage area for the first device 102 in the event the first device 102 has consumed all of the allocated space in the first storage module 214.

The flow then proceeds to a save message content module 412. The save message content module 412 can save a content of the communication event 306 for later retrieval. The content of the communication event 306 can include e-mail, text messages, audio messages, instant messages, VOIP messages, or a combination thereof. The save message content module 412 can store the content of the communication event 306 in the first storage module 214 of the first device 102. In some embodiments of the present invention, the save message content module 412 can be configured to store the contents of the communication event to the second storage module 246 within the second device 106.

The flow then proceeds to a save pending communication list module 413. The save pending communication list module 413 can generate a new version of the pending communication list 302 to include the communication event 306 that was just processed. The save pending communication list module 413 can update the pending communication list 302 in order to add a new communication event indicator 304 or it can link an updated version of the communication event indicator 304 that contains the contact list entry 310 of FIG. 3 from the communication event 306. The flow them proceeds to an exit communication event module 414 to complete the priority determination process 401.

Returning back to the contact list entry module 402, if the contact list entry module 402 determines the communication event 306 is associated with the contact list entry 310 already entered in the pending communication list 302, the flow proceeds to a get history data module 416 for the contact list entry 310. The get history data module 416 can include hardware and software which retrieves the history of the communication event 306 that were previously sourced from the contact list entry 310. The get history data module 416 can access the first storage module 214 to retrieve the history data and identify any pending priority from previous occurrences of the communication event 306. In some embodiments the get history data module 416 can transfer the history data from the second storage module 246 of the second device 106. This implementation can simplify the design of the first device 102 without altering the operation of the communication system 100 of FIG. 1.

The flow proceeds to a group determination module 418 decision. The group determination module 418 can identify whether the contact list entry 310 associated with the pending occurrence of the communication event 306 is a member of the enhanced priority group 312 of FIG. 3. The purpose of the enhanced priority group 312 is to allow a scaling factor to increase or diminish the value of the urgency based priority 308 attributed by the communication event 306. The group determination module 418 can escalate the urgency of calls from selected people such as family or friends and can diminish the urgency of calls from other selected people or entities.

If the enhanced priority group 312 is detected the flow then proceeds to a conditional trigger check module 420. The conditional trigger check module 420 can determine the presence of environmental conditions, attributed the enhanced priority group 312, which can alter the urgency of the communication event 306. The environmental condition is defined as selected forces or processes which can have a direct impact on the enhanced priority group 312. The environmental conditions can be selected at the time the enhanced priority group 312 is established. The monitoring of the environmental conditions can be performed by other functions of the communication system 100 of FIG. 2.

The conditional trigger check module 420 can evaluate public information which could alter the importance of a communication event 306 from a member of the enhanced priority group 312, such as weather alerts or natural disaster alerts in the geographical area of the enhanced priority group 312. The conditional trigger check module 420 can also evaluate notification of localized crime, such as activation of a home burglar alarm or broadcast police warnings, or health hazard alerts, which can impact the enhanced priority group 312. The monitoring of events that can impact the enhanced priority group 312 can be performed by the first device 102 or the second device 106. The conditional trigger check module 420 can alter the value of the urgency based priority 308 associated with the communication event 306.

If the conditional trigger check module 420 detects the presence of the environmental conditions, the flow proceeds to an priority scaling module 422 in order to apply a predefined scaling factor to alter the urgency based priority 308 of the communication event 306. It is understood that a different scaling factor can be applied for each of the environmental conditions evaluated by the conditional trigger check module 420 and can vary for each of the enhanced priority group 312. The priority scaling module 422 can access the first storage module 214 in order to retrieve the appropriate scaling factor for the conditional trigger check module 420 and the contact list entry 310 that is part of the enhanced priority group 312. In some embodiments the conditional trigger check module 420 and the scaling factor for the priority scaling module 422 can be maintained in the second storage module 246 of the second device 106 and is delivered to the first device 102 as part of the operation of the get history data module 416.

It has been discovered that the communication system 100 provides a flexible management system for displaying the urgency based priority 308 which can be scaled by the urgency of the communication event 306. If the conditional trigger check module 420 is activated, the communication event 306 can be altered in urgency to provide the urgency based priority 308 in order to solicit a more rapid response to the communication event 306. The conditional trigger check module 420 is independent of the communication event 306 and can escalate the urgency without the knowledge or action of the contact list entry 310 that is a part of the enhanced priority group 312.

The flow then proceeds to an apply priority scaling module 424. The apply priority scaling module 424 can apply the incremental degree of urgency to the communication event 306 based on the findings of the conditional trigger check module 420. If none of the conditional trigger 420 is detected the incremental urgency of the communication event 306 is maintained. If the conditional trigger check module 420 was detected, the incremental urgency of the communication event 306 can be altered to reflect the environmental scaling of the urgency related to the conditional trigger check module 420. The apply priority scaling module 424 can provide a scaled priority value that can be added to the urgency based priority 308.

The flow then proceeds to the update priority module 408 to aggregate the incremental change in urgency that is applied to the urgency based priority 308 as a result of the communication event 306. The urgency based priority 308 can reflect the degree of urgency imparted by the history data, environmental scaling, priority scaling, or a combination thereof. The keyword search of the update priority module 408 can be tabulated and included in the calculation of the urgency based priority 308.

The flow then proceeds to the save updated priority module 410. The save updated priority module 410 can store the value of the priority for the reference name in the first storage module 214 of FIG. 2 and save the pending communication list 302 in the first storage module 214 of the first device 102 or it can initiate a transfer of the updated version of the pending communication list 302 to the second storage module 246 within the second device 106. The save updated priority module 410 can maintain a look-up table in the first storage module 214 for accessing a list of priorities and the pending communication list 302. The save updated priority module 410 can establish new entries in the pending communication list 302 or update the priority for entries that already exist in the pending communication list 302. Access to the second device 106 can be a back-up process or it can be configured as the default storage area for the first device 102 in the event the first device 102 has consumed all of the allocated space in the first storage module 214.

The flow then proceeds to a save message content module 412. The save message content module 412 can save a content of the communication event 306 for later retrieval. The content of the communication event 306 can include e-mail, text messages, audio messages, instant messages, VOIP messages, or a combination thereof. The save message content module 412 can store the content of the communication event 306 in the first storage module 214 of the first device 102. In some embodiments of the present invention, the save message content module 412 can be configured to store the contents of the communication event to the second storage module 246 within the second device 106. The flow them proceeds to an exit communication event module 414 to complete the priority determination process 401.

The communication system 100 has been described with module functions or order as an example. The communication system 100 can partition the modules differently or order the modules differently. For example, the first device 102 can operate without having the first storage module 214 of FIG. 2 by utilizing the resources of the second device 106 of FIG. 1 and transferring the information including the pending communication list 302 through the communication path 104 of FIG. 1. The configuration of the first device 102 can be adjusted to meet cost or performance goals without losing any of the capability of the communication system 100.

The modules described in this application can be hardware implementation or hardware accelerators in the first control module 212 of FIG. 2 or in the second control module 234 of FIG. 2. The modules can also be hardware implementation or hardware accelerators within the first device 102 or the second device 106 but outside of the first control module 212 or the second control module 234, respectively.

Figure 5:
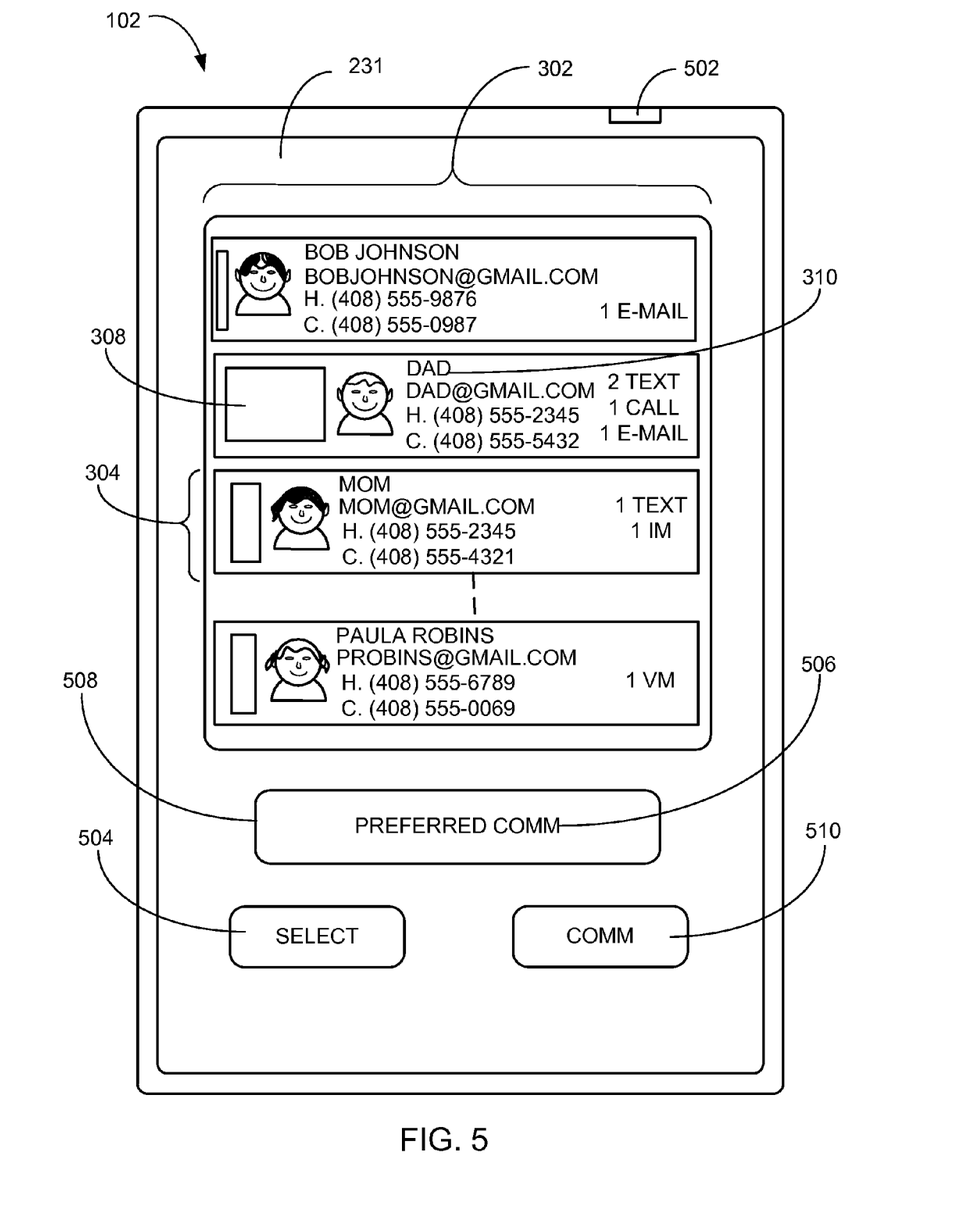
FIG. 5 is a front view of the first device having the pending communication list on the display device.

Referring now to FIG. 5, therein is shown a front view of the first device 102 having the pending communication list 302 on the display device 231. The first device 102 can provide a preferred response for each of the contact list entry 310 in the pending communication list 302. A rapid response for the highest priority can have a different preferred communication style for each of the contact list entry 310. The light emitting diode 502 can activate to alert the user that the pending communication list 302 is available.

A select button 504, such as a soft key on a touch screen, can select the most urgent communication based on the urgency based priority 308. Each of the contact list entry 310 can be configured to have a primary communication type 506 including e-mail, telephone call, text message, instant message, or voice over Internet protocol (VOIP) message. By activating the select button 504 the most urgent communication is selected from the pending communication list 302 and the primary communication type 506 for the contact list entry 310 in the communication event indicator 304 having the largest instance of the urgency based priority 308 is indicated in a preferred communication window 508. The display interface 218 of FIG. 2, coupled to the control module 212 of FIG. 2, can be configured to generate the preferred communication window 508 with the primary communication type 506 for the contact list entry 310.

The preferred communication window 508 can provide an indication of what the primary communication type 506 is for the contact list entry 310. When the most urgent instance of the contact list entry 310 is selected and the primary communication type 506 is displayed in the preferred communication window 508, activating a communicate button 510 will initiate the primary communication type 506.

The communicate button 510 can initiate a text message, a telephone call, an instant message, an e-mail, a VOIP message, or whatever the primary communication type 506 is configured for the contact list entry 310. At the completion of the communication with the contact list entry 310 having the largest instance of the urgency based priority 308, the communication event indicator 304 will be removed from the pending communication list 302.

By activating the select button 504 another time, the next highest priority instance of the communication event indicator 304. The process can continue until all instances of the communication event indicator 304 have been addressed. In the event any of the communication event indicator 304 are to be skipped, activating the select button 510 without activating the communicate button 510 will cause the next highest priority instance of the communication event indicator 304 to be selected. When all of the instances of the communication event indicator 304 have been selected or skipped the pending communication list 302 can be closed and the information will be retained for the next opportunity.

The physical transformation from an electronic transfer of information of the communication event 306 results in the movement in the physical world, such as a display of the pending communication list 302 having the urgency based priority 308 on the display device 231 of the first device 102 and causing the user of the first device 102 to take different actions that would otherwise not be taken without the urgency based priority 308. Movement in the physical world results in changes to the display device 231 allowing an access of the communication event indicator 304 having the most urgent need as indicated by urgency based priority 308.

Figure 6:
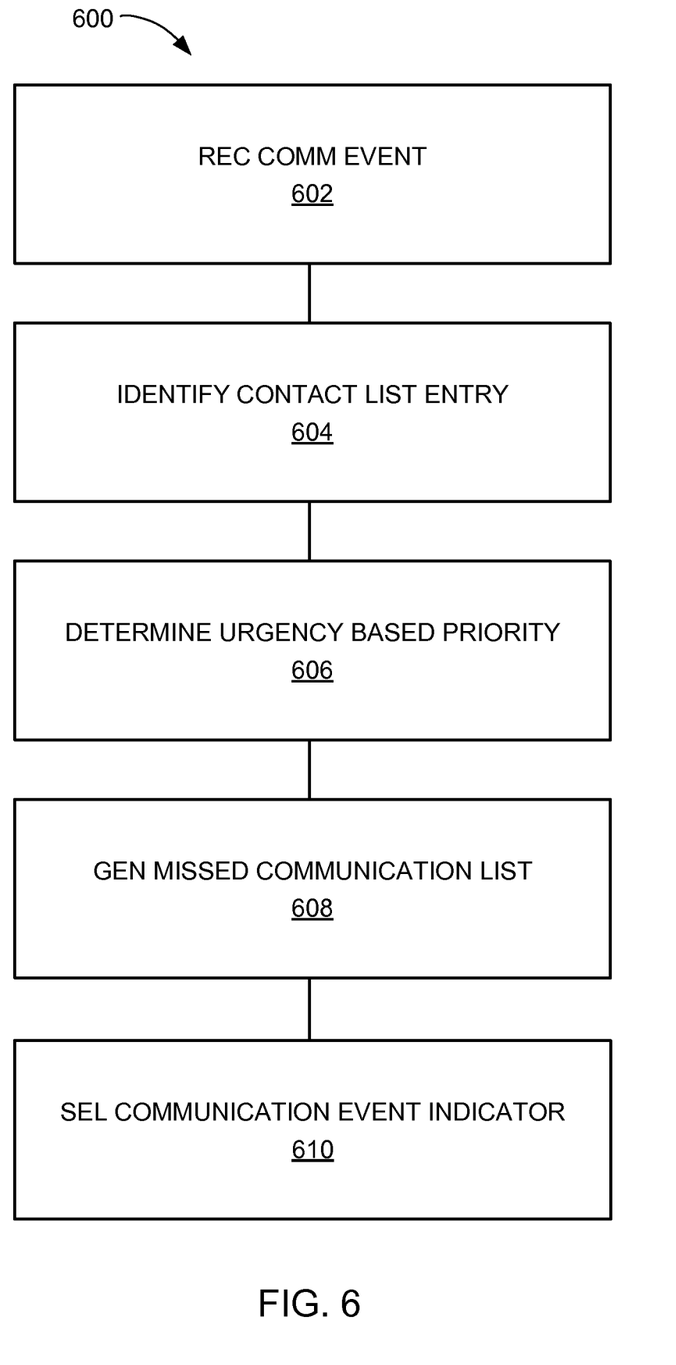
FIG. 6 is a flow chart of a method of operation of a communication system in an embodiment of the present invention.

Referring now to FIG. 6, therein is shown a flow chart of a method 600 of operation of a communication system 100 in a further embodiment of the present invention. The method 600 includes: processing a communication event by a control module in a block 602; identifying a contact list entry from the communication event in a block 604; calculating an urgency based priority for the communication event in a block 606; generating a pending communication list, having the urgency based priority for displaying on a display device in a block 608; and generating a communication event indicator, for the contact list entry, having the largest instance of the urgency based priority from the pending communication list for displaying on the device in a block 610.

The embodiment of the communication system provides a flexible management system for displaying the urgency based priority which can be scaled by the urgency of the communication event. If the conditional trigger check module is activated, the communication event can be altered in urgency to provide the urgency based priority in order to solicit a more rapid response to the communication event. The conditional trigger check module is independent of the communication event and can escalate the urgency without the knowledge or action of the contact list entry that is a part of the enhanced priority group.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the previous description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
a storage module configured to store a contact list entry; and
a control module, coupled to the storage module, configured to:
identify a contact list entry from a communication event;
calculate an urgency based priority for reflecting the degree of urgency based on a scaling factor associated with the communication event;
generate a pending communication list including the urgency based priority for displaying on a display device; and
select a communication event indicator, for the contact list entry, including the largest instance of the urgency based priority from the pending communication list with the communication event indicator for displaying on a device.

2. The system as claimed in claim 1 further comprising a display interface, coupled to the control module, configured to generate a preferred communication window with a primary communication type for the contact list entry.

3. The system as claimed in claim 1 wherein the control module is configured to establish an enhanced priority group including the contact list entry stored therein.

4. The system as claimed in claim 1 further comprising a controller interface, coupled to the control module, configured to establish a conditional trigger configured to alter the urgency based priority.

5. The system as claimed in claim 1 further comprising an update priority module, coupled to the control module, configured to identify a keyword in the communication event.

6. A method of operation of a communication system comprising:
processing a communication event by a control module;
identifying a contact list entry from the communication event;
calculating an urgency based priority for reflecting the degree of urgency based a scaling factor associated with the communication event;
generating a pending communication list, including the urgency based priority for displaying on a device; and
generating a communication event indicator, for the contact list entry, including the largest instance of the urgency based priority from the pending communication list for displaying on the device.

7. The method as claimed in claim 6 further comprising displaying a primary communication type for the contact list entry by selecting the communication event indicator including the largest instance of the urgency based priority.

8. The method as claimed in claim 6 further comprising establishing an enhanced priority group with the contact list entry for altering the urgency based priority attributed by the communication event.

9. The method as claimed in claim 6 further comprising establishing a conditional trigger for altering the urgency based priority.

10. The method as claimed in claim 6 further comprising identifying a keyword in the communication event.

11. A method of operation of a communication system comprising:
processing a communication event by a control module including receiving a telephone call;
identifying a contact list entry from the communication event by monitoring an identification of the telephone call;
calculating an urgency based priority for reflecting the degree of urgency based on a scaling factor associated with the communication event including retrieving a history of previous instances of the communication event initiated by the contact list entry;
generating a pending communication list, including the urgency based priority for displaying on a device; and
generating a communication event indicator, for the contact list entry, including the largest instance of the urgency based priority from the pending communication list for displaying on the device.

12. The method as claimed in claim 11 further comprising displaying a primary communication type for the contact list entry by selecting the communication event indicator including the largest instance of the urgency based priority including activating a communicate button for responding with the primary communication type.

13. The method as claimed in claim 11 further comprising establishing an enhanced priority group with the contact list entry for altering the urgency based priority attributed by the communication event.

14. The method as claimed in claim 11 further comprising establishing a conditional trigger for altering the urgency based priority including applying an environmental scaling to the urgency based priority.

15. The method as claimed in claim 11 identifying a keyword in the communication event by an update priority module including altering the urgency based priority based on the keyword.

16. The system as claimed in claim 1 wherein the control module is configured to retrieve a history of previous instances of the communication event from the contact list entry.

17. The system as claimed in claim 16 further comprising a display interface, coupled to the control module, configured to generate a preferred communication window with a primary communication type for the contact list entry includes the communication event indicator, including the largest instance of the urgency based priority configured to display on the first device.

18. The system as claimed in claim 16 wherein the control module is configured to establish an enhanced priority group including the contact list entry stored therein includes the urgency based priority altered by the control module based on the communication event.

19. The system as claimed in claim 16 wherein the control module includes a controller interface configured to establish a conditional trigger configured to alter the urgency based priority includes the control module applied an environmental scaling to the urgency based priority.

20. The system as claimed in claim 16 wherein the control module is configured to identify a keyword in the communication event includes the urgency based priority altered by the control module based on the keyword.

* * * * *